United States Patent [19]
Vertil

[11] Patent Number: 6,013,302
[45] Date of Patent: Jan. 11, 2000

[54] FRUIT SALAD DRESSING

[76] Inventor: Roselyne Vertil, 3600 Normandy Dr. #13A, Port Arthur, Tex. 77642

[21] Appl. No.: 09/065,146

[22] Filed: Apr. 23, 1998

[51] Int. Cl.$^7$ ....................................................... A23L 1/24
[52] U.S. Cl. .......................... 426/589; 426/592; 426/599; 426/615
[58] Field of Search ..................................... 426/592, 615, 426/599, 589

[56] References Cited

U.S. PATENT DOCUMENTS 4,988,529  1/1991  Nakaya et al. ............................ 426/569

OTHER PUBLICATIONS

Rombauer et al., "Joy of Cooking", Bobbs–Merrill Co. Inc., Publishers, N.Y. pp. 126–127, 761–762, 769–770, 1975.
"Classic Desserts", The Good Cook Techniques & Recipes, Editors: Time–Life Books, VA, p. 166, 1980.

*Primary Examiner*—Chhaya D. Sayala

[57] ABSTRACT

A method of preparing a fruit salad dressing is provided including the steps of blending a predetermined amount of fruit to render a first mixture; boiling milk and a seasoning; cooling the milk to generate a second mixture; providing alcohol, juice and vanilla; and blending the alcohol, juice, vanilla and the first mixture with the second mixture in a predetermined order.

1 Claim, 3 Drawing Sheets

FRUIT SALAD DRESSING

BACKGROUND OF THE INVENTION

1. Field of the Invention

The present invention relates to recipes and more particularly pertains to a new fruit salad dressing for preparing a creamy fruit dressing.

2. Description of the Prior Art

The use of recipes is known in the prior art. More specifically, recipes heretofore devised and utilized are known to consist basically of familiar, expected and obvious structural configurations, notwithstanding the myriad of designs encompassed by the crowded prior art which have been developed for the fulfillment of countless objectives and requirements.

Known prior art recipes include U. S. Pat. No. 5,260,083; U.S. Pat. No. 5,258,198; U.S. Pat. No. 4,693,900; U.S. Pat. No. 4,393,090; U.S. Pat. No. 4,396,817; U.S. Pat. No. 5,356,648; U.S. Pat. No. 5,106,643; U.S. Pat. No. 4,935,259; and U.S. Pat. No. 4,597,974.

In these respects, the fruit salad dressing according to the present invention substantially departs from the conventional concepts and designs of the prior art, and in so doing provides an apparatus primarily developed for the purpose of preparing a creamy fruit dressing.

SUMMARY OF THE INVENTION

In view of the foregoing disadvantages inherent in the known types of recipes now present in the prior art, the present invention provides a new fruit salad dressing construction wherein the same can be utilized for preparing a creamy fruit dressing.

The general purpose of the present invention, which will be described subsequently in greater detail, is to provide a new fruit salad dressing apparatus and method which has many of the advantages of the recipes mentioned heretofore and many novel features that result in a new fruit salad dressing which is not anticipated, rendered obvious, suggested, or even implied by any of the prior art recipes, either alone or in any combination thereof.

To attain this, the present invention generally comprises a process of preparing a fruit salad dressing. Such process first includes the step of blending a predetermined amount of strawberries to render a first mixture. Milk and cinnamon sticks are then boiled. Next, the milk and cinnamon sticks are cooled and drained after which sugar is gradually dissolved with the milk to render a second mixture. Thereafter, alcohol, lime juice, and vanilla are mixed with the second mixture in a predetermined order. Finally, the first mixture is blended with the second mixture to render the fruit salad dressing which may be mixed with fruit or any other type of desert.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fruit salad dressing apparatus and method which has many of the advantages of the recipes mentioned heretofore and many novel features that result in a new fruit salad dressing which is not anticipated, rendered obvious, suggested, or even implied by any of the prior art recipes, either alone or in any combination thereof.

It is another object of the present invention to provide a new fruit salad dressing which may be easily and efficiently manufactured and marketed.

It is a further object of the present invention to provide a new fruit salad dressing which is of a durable and reliable construction.

An even further object of the present invention is to provide a new fruit salad dressing which is susceptible of a low cost of manufacture with regard to both materials and labor, and which accordingly is then susceptible of low prices of sale to the consuming public, thereby making such fruit salad dressing economically available to the buying public.

Still yet another object of the present invention is to provide a new fruit salad dressing which provides in the apparatuses and methods of the prior art some of the advantages thereof, while simultaneously overcoming some of the disadvantages normally associated therewith.

Still another object of the present invention is to provide a new fruit salad dressing for preparing a creamy fruit dressing.

Even still another object of the present invention is to provide a new fruit salad dressing that is produced by the steps of blending a predetermined amount of fruit to render a first mixture; boiling milk and a seasoning; cooling the milk to generate a second mixture; providing alcohol, juice and vanilla; and blending the alcohol, juice, vanilla and the first mixture with the second mixture in a predetermined order.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
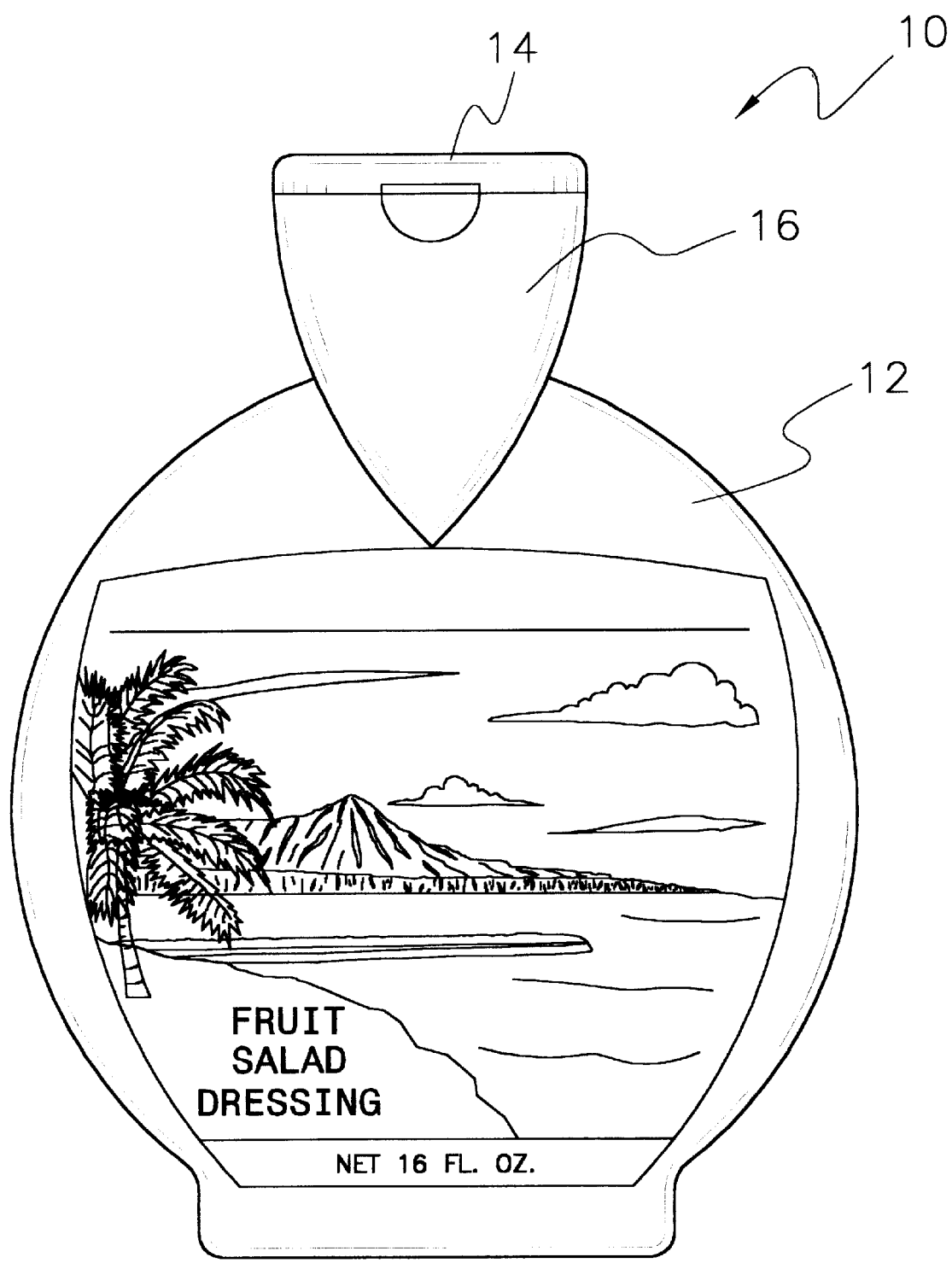
FIG. 1 is a front view of a bottle in which the fruit salad dressing is stored.
Figure 2:
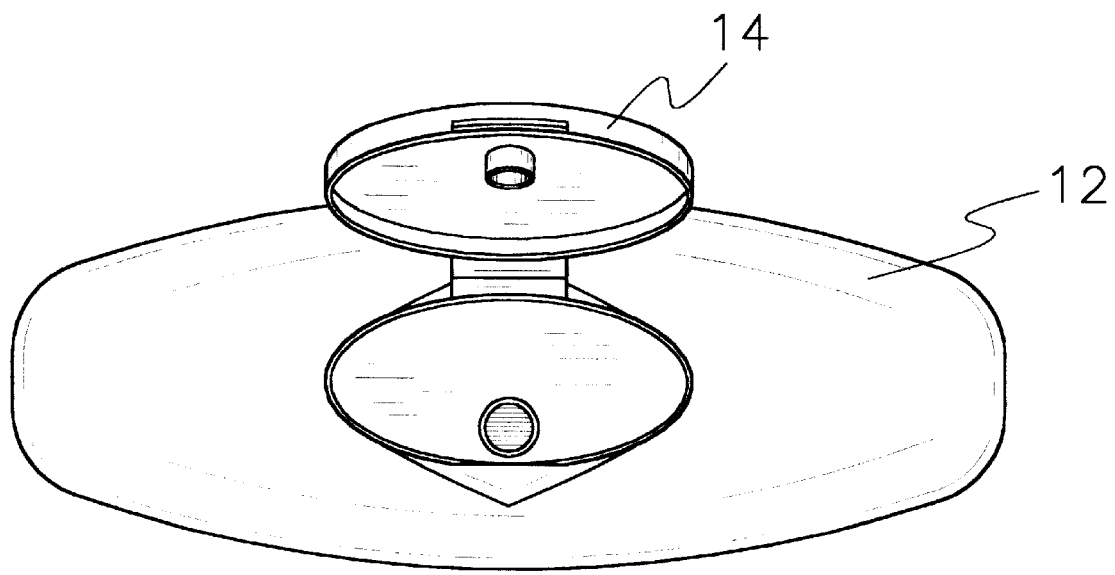
FIG. 2 is a top view of the bottle of FIG. 1.
Figure 3:
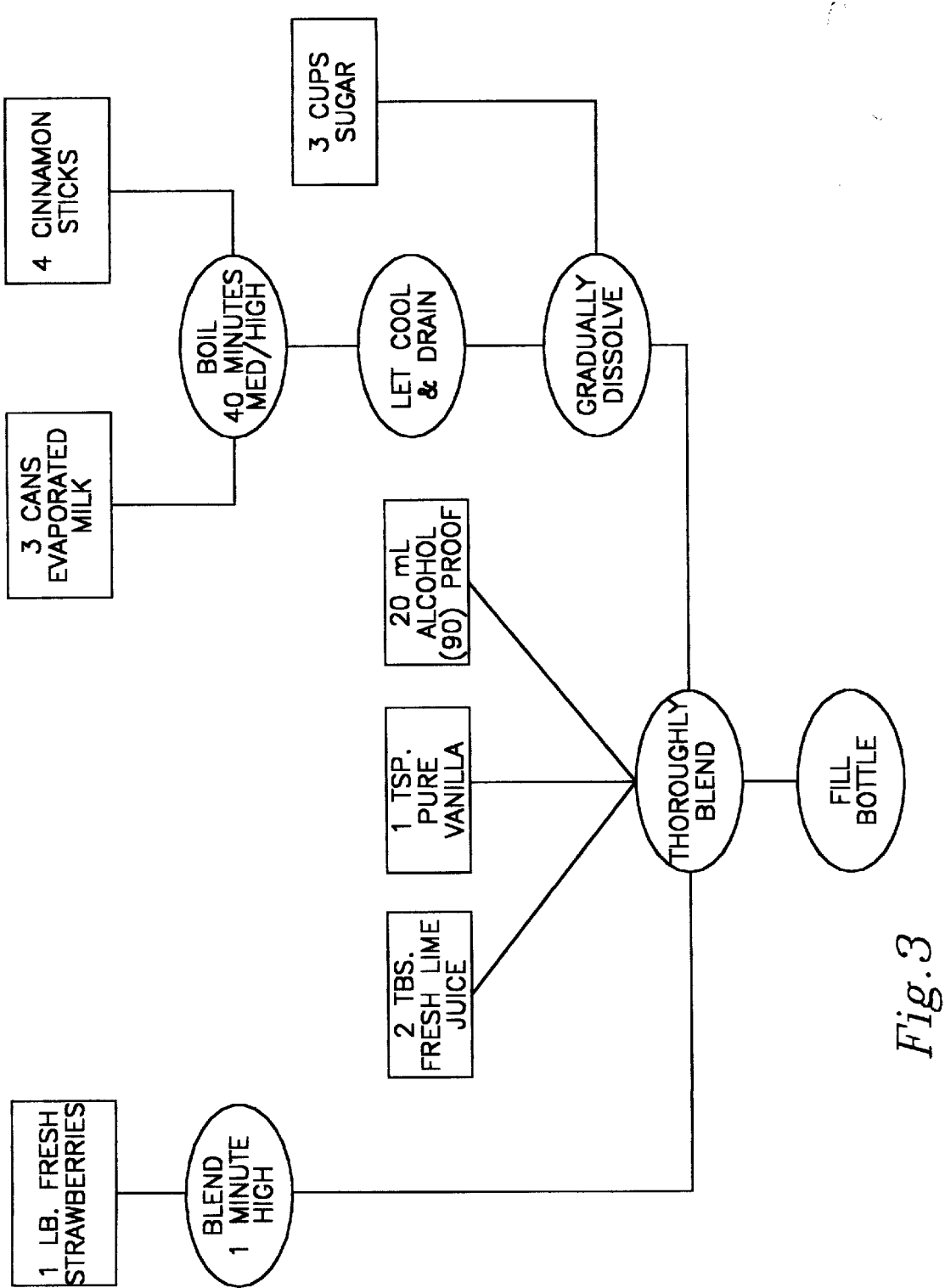
FIG. 3 is a flow chart showing the process of the present invention.

With reference now to the drawings, and in particular to FIGS. 1 through 3 thereof, a new fruit salad dressing embodying the principles and concepts of the present invention and generally designated by the reference numeral 10 will be described.

The present invention, designated as numeral 10, includes a process of preparing a fruit salad dressing. As shown in FIG. 3, such process first includes the step of blending 1 pound of strawberries, or other kind of fruit, to render a first mixture. Preferably, the strawberries are blended at a high speed (i.e. liquefy) for about 1 minute, thereby rendering approximately 1 and ½ cups of strawberry mixture. Thereafter, the first mixture is drained and refrigerated.

Milk and cinnamon sticks are then boiled for about 40 minutes at medium\high heat. Ideally, three cans of milk and 4 cinnamon sticks are used. Next, the milk and cinnamon sticks are cooled and drained for removing the cinnamon sticks and any resultant residue. Thereafter, 3 cups of sugar are gradually dissolved with the milk to render a second mixture without the cinnamon sticks and any resultant residue.

Thereafter, 2–3 tbs. of lime juice (preferably 2 tbs.), 1 tsp. of vanilla and 20 mL of 38–48% or preferably 90% alcohol are added to the second mixture. It is critical that the forgoing components are added to the second mixture in a specific predetermined order. Namely, the alcohol is added first, the lime juice is added second, the vanilla is added third and the first mixture is added last. The first mixture is preferably blended in at a low blender speed. It should be noted that the inherent ratios and proportions associated with the aforementioned amounts may be applied to generate larger or smaller quantities of the fruit salad dressing.

For storage purposes, the fruit salad dressing is stored in a plurality of 8 or 16 ounce squeezable bottles 12. As shown in FIG. 2, the bottles are equipped with a hingably coupled lid 14 equipped with a lift tab. An upper neck 16 of each bottle to which the lid is coupled preferably takes the shape of the fruit which is used in the first mixture. In use, the fruit salad dressing may be applied to fruit, pie, ice cream or any other type of desert.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of preparing and using a fruit salad dressing comprising the steps of:

blending about 1 pound of strawberries to render a first mixture;

draining the first mixture;

boiling milk and four cinnamon sticks for about 40 minutes;

cooling and draining the milk and cinnamon sticks;

dissolving 3 cups of sugar gradually with the milk and cinnamon sticks to render a second mixture;

providing between about 2 and 3 tablespoons of lime juice, 1 teaspoon of vanilla and about 20 mL of at least 38% alcohol;

blending the alcohol with the second mixture;

blending the lime juice with the second mixture;

blending the vanilla with the second mixture;

blending the first mixture with the second mixture to afford the fruit salad dressing;

mixing the fruit salad dressing with fruit.

\* \* \* \* \*